Oct. 26, 1954

M. KNOBEL 2,692,498

AIR GAUGE

Filed Feb. 7, 1951

INVENTOR.
MAX KNOBEL

BY Kenway Jenney Witter
H Hildreth

ATTORNEYS

Patented Oct. 26, 1954

2,692,498

UNITED STATES PATENT OFFICE 2,692,498

AIR GAUGE

Max Knobel, Arlington, Mass.

Application February 7, 1951, Serial No. 209,751

4 Claims. (Cl. 73—37.5)

The present invention relates to air gages.

The conventional air gage for accurately measuring short distances comprises a restricted passage to which a nozzle is connected, a pressure measuring device being connected to a chamber between the restricted passage and the nozzle. The pressure registered by the measuring device is a function of the distance of the surface of a part to be measured from the end of the nozzle. This conventional device, although extremely accurate for small distances, has a number of disadvantages. In the first place, the functional relation between pressure and distance is not linear except over a very short range. Second, the device is useful for measurements for over only an extremely short range. The maximum range is usually not greater than .002 inch and the device is therefore suitable for measurements which are expressed as tenths of thousandths. The difficulties are increased in the measurement of moving sheet material where a change of even a few thousandths of an inch, as might result from a fold or a wrinkle, will not even allow the sheet to pass through the equipment.

The object of the present invention is to provide an improved air gage which, without sacrificing the inherent accuracy of air gaging, provides a substantial increase of range, with substantial linearity over the extended range.

Another object of the invention is to devise an air gage construction by which a variety of characteristics as to sensitivity and range can be obtained.

With this object in view, the principal feature of the invention comprises a nozzle having a gaging orifice and arranged to be connected with a source of air under pressure, together with a passage by which the gaging air flows, which passage is arranged for connection to a pressure-indicating device. In the preferred form, of the invention, the passage which is connected with the indicating device is formed by a tube within and extending lengthwise of the nozzle. The characteristics of the instrument are determined by the relative dimensions of the tube with respect to the nozzle. The readings of the indicating device are a measure of the degree of obstruction of the orifice. An important difference over the conventional gage is that it is possible to extend the range into the negative pressure region.

Figure 1:
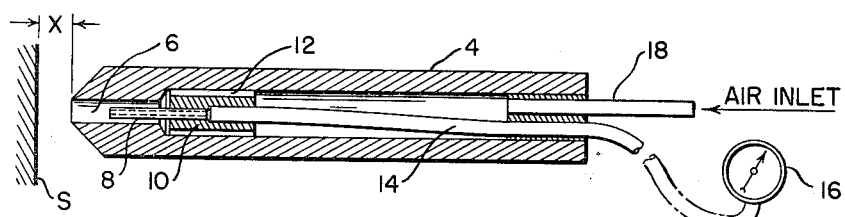
Figure 2:
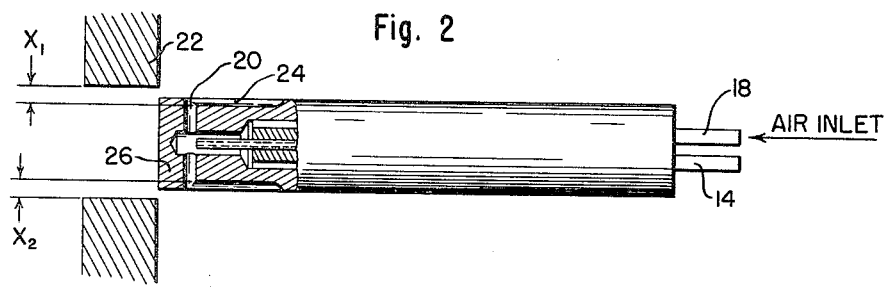
Figure 3:
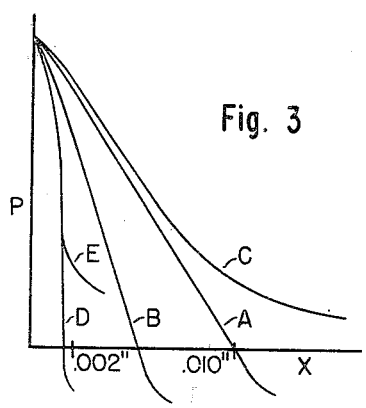

In the accompanying drawings, Fig. 1 is an elevation of the preferred form of air gage according to the present invention; Fig. 2 is a sectional elevation of a modified form of the invention used for gaging inside diameters; and Fig. 3 is a diagram illustrating the characteristics of the gage.

The illustrated embodiment of the invention comprises a nozzle casing 4 having a tubular exit orifice 6. The walls of casing 4 terminate at their left-hand end, as they appear in the drawing, in a conical tip. The nozzle casing 4, its conical tip, and the tubular orifice 6 are all concentric. The conical tip joins the tubular orifice 6 in a sharp edge. A conduit formed by a piece of metal tubing 8 extends part way down the orifice 6, and is held in place by a plug 10 having a fluted periphery 12 to permit passage of air through the orifice 6. A tube 14 connects the tube 8 to a pressure indicating instrument shown as a conventional pressure gage 16. Air under pressure is admitted to the interior of the casing 4 through an inlet tube 18; thus air entering at 18 passes through the casing 4 and the flutes 12 into the orifice 6 from which it is discharged at the end. During its passage through the orifice 6 it passes by the end of the internal tube 8.

To explain the operation of the system, consider a piece of work to be measured, the work having a surface designated at S spaced at a distance $x$ from the end of the orifice 6. The pressure at 16 is a function of the distance $x$. A characteristic curve is shown at A in Fig. 3 wherein the pressure P is measured against the distance $x$. As shown for this curve the characteristic is substantially linear over a long range. For values at $x$ between zero and .010 inch, the measured pressure is positive while for greater separations the pressure becomes negative. A brief explanation of the operation is as follows: If the surface S completely closes the orifice, that is if $x=0$, the measured pressure is equal to the air inlet pressure. On the other hand, if the surface S is moved a large distance away, a negative pressure will be registered by reason of the aspirating effect of the air flowing past the end of the tube 8. The characteristic is remarkably linear over a long range, although for extreme values of $x$ the pressure obviously approaches a constant (negative) value because the flow of air through the orifice is not appreciably affected for small changes in $x$ when $x$ is very large.

The characteristic shown at A was obtained with an instrument having an orifice diameter of .031 inch with the end of the tube 8 set back from the end of the orifice by a distance of about ⅛ inch. In that case, the tube 8 had an outside diameter of .018 inch.

The ability of the instrument to give desired characteristics by a simple change in dimensions is shown by curve B, wherein the only change is a reduction of the orifice diameter from .031 inch to .024 inch. This gives a characteristic of steeper slope and hence of greater sensitivity but with somewhat smaller range. If the end of the tube 8 is placed nearer the outer end of the orifice 6, a characteristic of somewhat less slope is obtained, and the extension of the range into the negative pressure region may be reduced. Thus, if the end of the tube 8 is made flush with the end of the orifice the characteristic such as shown at C is obtained.

The connections 14 and 18 may be reversed; in other words, the pressure gage 16 may be connected with the tube 18 while the air is introduced through the tube 14. In this case an exceptionally linear curve of high sensitivity is attained, but with some reduction of range. A typical characteristic for this connection is shown at D, the parts being the same dimensions as for characteristic A.

The foregoing curves are to be compared with the characteristic E for a standard air gage which has an extremely limited range, and which becomes non-linear for pressures considerably above zero. It will be understood that linearity is of considerable importance for two reasons, first, that only a single master standard is needed to give a zero reading, and second, that multiple nozzles may be used with assurance that the indicated pressures may be added without introducing errors. One example of the addition of pressure indications is afforded by the measurement of a sheet by the use of nozzles on opposite sides, and another by the averaging of the indications of several gages applied to surface of considerable extent.

A modified form of device is shown in Fig. 2 wherein the air passage is brought out to two orifices 20 at the sides. This device is adapted to be inserted into a piece of work 22 to measure the inside diameter. The principles heretofore noted in connection with Fig. 1 apply, and it is here that linearity of the characteristic is desirable since the size is measured by the sum of $x_1$ and $x_2$, so that it is unimportant whether the instrument is accurately centered in the hole. Preferably, the body of the gage is relieved by grooves 24 in the rear of the orifices 20, and the measurement is taken from the base of each groove. The large range allows the head of the instrument to be made considerably smaller with relation to the hole diameter than in the case of the standard gage so that measurements over a wide range of tolerances can be effected.

An important advantage of the present invention is that the instrument is not subject to difficulties due to wear. In the conventional gage wherein the entire range is measured in tenths of thousandths a slight amount of wear renders the gage useless, whereas no such difficulties are present with the present invention since the tolerances are greatly increased. For example, in Fig. 2, wear on the tip 26 is unimportant, until the tip is reduced to approximately the roots of the grooves 24; and in view of the extended range the grooves may be made quite deep. Furthermore, because of the greater tolerances possible with the gage of the present invention, it is not necessary to design the gage for a close fit with the part to be measured, and wear is greatly reduced for that reason.

It will be understood that other multiple-nozzle arrangements than that shown in Fig. 2 may be made, as will be clear to those skilled in the art, as for example, in the use of opposed orifices to direct streams of air against opposite sides of sheet. In other respects also, the invention is not limited to the particular embodiments herein shown and described, but may be varied in form and construction within the purview of the appended claims.

Having thus described the invention, I claim:

1. An air gage comprising a casing having an elongated cylindrical orifice passage, a cylindrical conduit forming a second passage within and concentric with said orifice passage and terminating within said orifice passage in the rear of the end of the orifice passage by a distance which is several times the diameter of the conduit, means for supplying air under pressure to the orifice passage, and a connection for said conduit to pressure-responsive means.

2. An air gage comprising a hollow, generally cylindrical casing, means defining at least one discharge orifice opening from said casing, said casing having an elongated cylindrical passage extending axially thereof and communicating with said discharge orifice for supplying air thereto, a cylindrical conduit forming a second passage within and concentric with a portion of said axial passage, said conduit terminating in an open end at a locality spaced from said orifice, said conduit and said casing cooperating to define a passage of constant annular cross-section throughout a substantial distance extending in an upstream direction from said conduit end, said distance being sufficient so that the air approaching said conduit end moves in a substantially straight path, means providing fluid communication to the upstream end of said annular passage for supplying air under pressure thereto, and means providing fluid communication to said second passage and adapted to connect said second passage to a pressure-responsive device.

3. An air gage as defined in claim 2, in which said orifice defining means comprises a conical tip on one end of said casing and joining said axial passage in a sharp edge.

4. An air gage as defined in claim 2, in which said orifice defining means comprises portions of the casing defining at least two longitudinal, diametrically opposite grooves in the outer surface of the casing, said casing having radial passages connecting said grooves with said axial passage.

References Cited in the file of this patent

UNITED STATES PATENTS

| Number | Name | Date |
|---|---|---|
| 1,757,573 | Heinrich | May 6, 1930 |
| 2,359,236 | Moore | Sept. 26, 1944 |
| 2,523,564 | Fortier | Sept. 26, 1950 |
| 2,539,624 | Huggenberger | Jan. 30, 1951 |

FOREIGN PATENTS

| Number | Country | Date |
|---|---|---|
| 874,659 | France | Aug. 18, 1942 |